July 21, 1959   A. M. BENTLEY ET AL   2,895,205
MACHINES FOR OPERATING ON BLANKS OF CERAMIC WARE
Filed March 26, 1954   9 Sheets-Sheet 1

Fig.1

Inventors:
Alfred M. Bentley
Leslie Garratt
Charlie A. Smith
By their Attorney
Thomas J. Ryan.

Fig. 4

Inventors:
Alfred M. Bentley
Leslie Garratt
Charlie A. Smith
By their Attorney
Thomas J Ryan July 21, 1959 A. M. BENTLEY ET AL 2,895,205
MACHINES FOR OPERATING ON BLANKS OF CERAMIC WARE
Filed March 26, 1954 9 Sheets-Sheet 7

Inventors:
Alfred M. Bentley
Leslie Garratt
Charlie A. Smith
By their Attorney
Thomas J. Ryan July 21, 1959　　A. M. BENTLEY ET AL　　2,895,205
MACHINES FOR OPERATING ON BLANKS OF CERAMIC WARE
Filed March 26, 1954　　9 Sheets-Sheet 8

Fig.14

Inventors:
Alfred M. Bentley
Leslie Garratt
Charlie A. Smith
By their Attorney
Thomas J. Ryan

United States Patent Office 2,895,205
Patented July 21, 1959

2,895,205

MACHINES FOR OPERATING ON BLANKS OF CERAMIC WARE

Alfred Maurice Bentley, Leslie Garratt, and Charlie Ambrose Smith, Leicester, England, assignors to United Shoe Machinery Corporation, Flemington, N.J., a corporation of New Jersey Application March 26, 1954, Serial No. 418,969

Claims priority, application Great Britain April 15, 1953

3 Claims. (Cl. 25—24)

This invention relates to machines for use in the manufacture of ceramic ware. In the manufacture of articles of ceramic ware from clay, a blank is usually formed from moist clay and subjected to a partial drying operation in an oven after which a surface finishing operation is performed and the blank is subsequently fired. In manufacturing circular articles such as plates or saucers, the finishing operation is usually performed while the blank is rotated on a rotatable support by fettling the edge with a tool consisting of a piece of spring steel having a V-shaped notch in it and towing a face of the blank to make it smooth with a piece of towing material such as emery cloth, felt or tow.

It is an object of the present invention to provide an improved machine for carrying out the aforementioned finishing operations on a blank of ceramic ware.

To this end and in accordance with a feature of the invention, the blank is supported on a rotary work support which is initially turned at low speed to facilitate centering the blank thereon, the blank being held in place by suction and then, with the support turning at high speed, a towing tool is moved into engagement therewith. The towing tool is automatically moved, in accordance with another feature of the invention, first into contact with the central portion of the blank and then across the surface of the blank toward its outer edge and then lifted out of engagement with the blank.

Provision is made, in accordance with a further feature of the invention, for smoothing the edge of the blank with a fettling tool and also with a towing tool, the fettling operation taking place while the blank is turned at low speed and the surface towing operation being performed only in response to rotation of the support at a predetermined high speed. The speed is controlled by the operator by depressing a treadle, the speed increasing as the treadle is depressed farther and farther.

For controlling the operation of the surface towing tool and in accordance with a still further feature of the invention, the tool is mounted at one end of an arm pivoted about a substantially horizontal axis whereupon the swinging of the arm about the axis moves the tool toward or away from the work, the arm also being mounted for movement about a substantially vertical axis parallel with the axis of rotation of the work support to move the towing tool over the surface of the work, there being means for moving the arm about the two axes in accordance with a predetermined cycle.

The above and other features of the invention including novel combinations of parts and details of construction will now be described by reference to the drawings and pointed out in the claims.

The machine is illustrated as comprising a base 10 composed of posts 12 on which is supported a table 14. The posts are connected by cross bars 16. Supported above the table 14 on posts 18 is a platform 20 above which is carried for rotation a work support 22.

The work support 22 comprises a carrier 24 (Figs. 3 and 7) having a flanged periphery for holding an annular head 26 formed of any suitable material such as plaster, the lower portion of the head having a conical surface complemental to the inner surface of the flange on the carrier. The upper rim of the head 26 is lined with soft material such as felt 28 for receiving the work piece.

Figure 7:
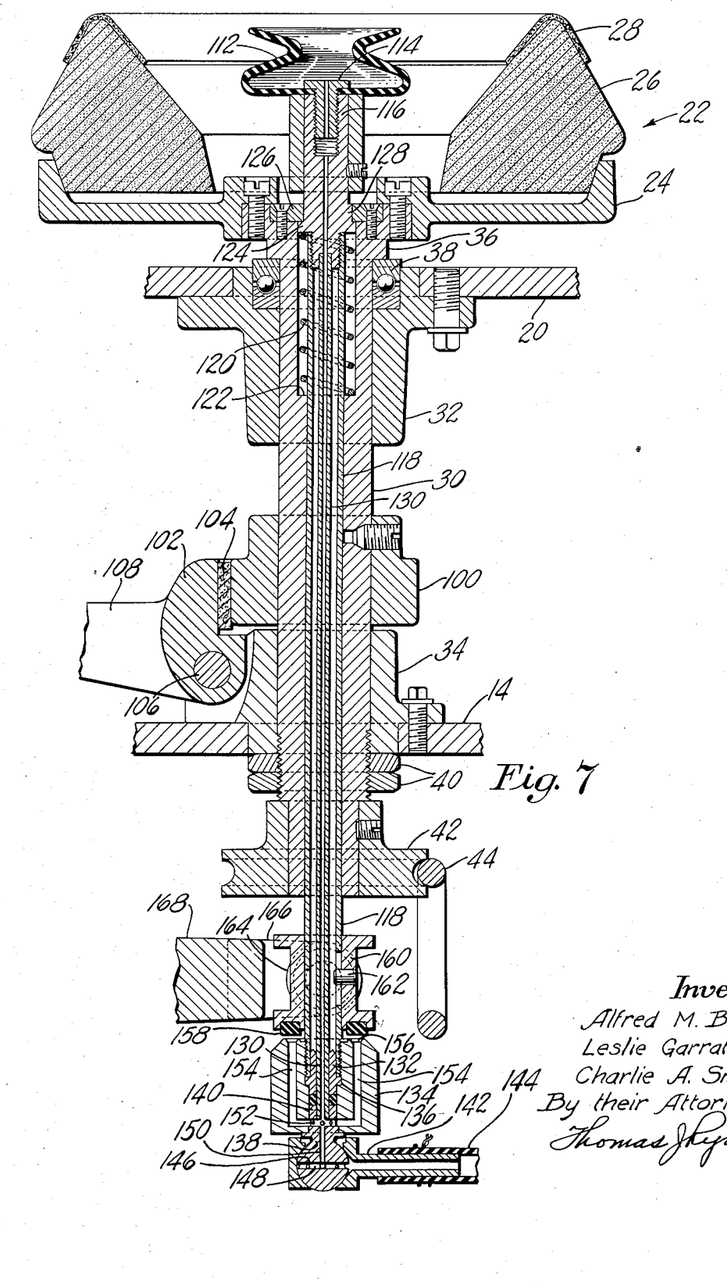
Fig. 7 is a vertical section through the work support and the means by which the support is mounted.

The work support 22 is carried for rotation by a hollow shaft 30 journaled in bearing sleeves 32, 34 secured to the platform 20 and the table 14 respectively. The upper end of the shaft 30 has a flanged portion 36 which rests on a ball bearing 38 carried by the upper bearing sleeve 32. For preventing axial movement of the hollow shaft 30 its lower end portion is threaded to receive nuts 40, the upper one of which engages the lower surface of the bearing sleeve 34. Secured to the lower end of the shaft 30 is a pulley 42 adapted to be engaged by a belt 44 which is continually driven, this belt normally being out of engagement with the pulley 42 but moved into engagement therewith by means to be described when it is desired to rotate the work support 22.

The belt 44 is carried by pulleys 46, 48 (Fig. 1) which are in turn carried by shafts 50, 52 so that the upper run of the belt runs alongside the pulley 42 on the shaft 30. The shaft 50 is journaled in brackets 54 extending downwardly from the table 14 and the shaft 52 is carried by brackets 56 secured to the right side of the frame of the machine. The shaft 50 also has secured to it a pulley 58 connected by a belt 60 with a pulley 62 on the shaft of a motor 64 secured to the base of the machine. The motor 64 is operated continually while the machine is in operation so that the belt 44 is in continual operation.

Figures 15, 16:
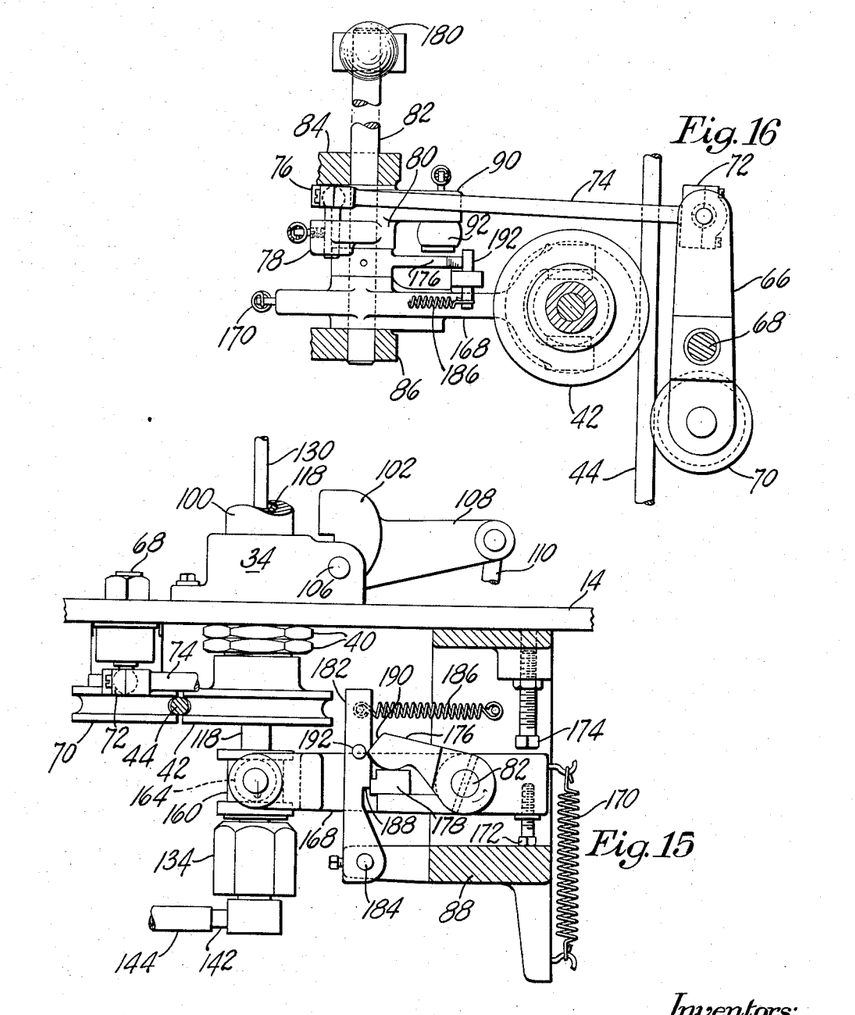
Fig. 15 is a side elevation partly in section of mechanism for controlling the valve by which the air is exhausted to hold the work on the work support.
Fig. 16 is a plan view partly in section of the mechanism for rotating the work support.

For moving the belt 44 into engagement with the pulley 42 to drive the shaft 30 and rotate the work support, mechanism shown in Fig. 16 is provided. Carried by an arm 66 pivoted on a pin 68 secured to and depending from the table 14 is a pulley 70 arranged upon clockwise movement of the arm 66, as viewed in Fig. 16, to urge the belt into contact with the pulley 42. Connected by a ball and socket joint 72 to the arm 66 is a link 74 which is connected by a ball and socket joint 76 to an arm 78 of a bell crank lever 80 journaled on a shaft 82 which is in turn journaled in the left side of the frame of the machine and in arms 84, 86 of a bracket 88 (Fig. 1) secured to the underside of the table 14. A second arm 90 of the bell crank lever 80 is pivotally connected to a treadle rod 92 (Figs. 1 and 3) the lower end of which is pivoted to a treadle 94 which is in turn pivoted on a shaft 96 extending transversely of the machine at the lower portion thereof. The treadle 94 is normally urged upwardly by a tension spring 98 connected between the upper end of the treadle rod 92 and a hook on the underside of the platform 20. Upon depression of the treadle 94 the bell crank lever 80 is rocked in a clockwise direction (Fig. 3) to move the arm 66 (Fig. 16) in a clockwise direction moving the pulley 70 against the belt 44 which is accordingly forced into engagement with the pulley 42. Engagement of the pulley 42 by the belt causes rotation of the shaft 30, the speed of rotation varying with the pressure exerted on the belt 44 so that the speed of rotation of the support 22 increases as the treadle is depressed further during the first part of its downward movement.

Provision is made for arresting rotation of the shaft 30 upon release of the treadle and movement of the pulley 70 away from the pulley 42. For this purpose the shaft 30 (Fig. 7) has secured to it a collar 100 arranged to be engaged by a brake member 102 carrying a brake lining 104. The brake member is pivoted at 106 on the bearing sleeve 34 and has an arm 108 extending forwardly therefrom and connected by a treadle rod 110 (Fig. 1) to the treadle 94. Normally the brake member 102 is held in braking engagement with the collar 100 but upon depression of the treadle to start rotation of the work support the brake member is pivoted in a counterclockwise direction as viewed in Fig. 7 to release the shaft 30 for rotation. Upon release of the treadle to permit movement of the drive belt 44 out of engagement with the pulley 42 the brake member becomes operative to arrest the rotation of the shaft and the work support carried thereby.

In order to hold the work in place on the support 22, a suction cup 112 formed of rubber or other suitable material is provided for engagement with the undersurface of the work, the cup being connected to a suitable source of suction as will be explained. The cup 112 is clamped between a nut 114 and the upper end of a member 116 the lower end of which is threaded into the upper end of a tube 118 extending downwardly through the hollow shaft 30. The tube 118 and the member 116 carrying the suction cup 112 are urged upwardly into the position illustrated in Fig. 7 by a spring 120 acting between a shoulder 122 formed in the upper end of the hollow shaft 30 and a flange 124 formed on the member 116. The uppermost position of these parts is determined by engagement of the flange 124 with a collar 126 secured to the upper end of the hollow shaft 30. A splined connection is provided at 128 between the member 116 and the collar 126 preventing rotation of the member 116 relative to the support 22 while permitting axial movement thereof.

Received in the lower end of the member 116 is a tube 130 having a passageway therethrough communicating with a bore through the nut 114 thus providing communication between the interior of the suction cup 112 and the tube. The lower end of the tube 130 is held in spaced relation within the tube 118 by a spacing member 132 which is in turn held in place by a nut 134 threaded on the lower end of the outer tube 118, the nut acting to clamp a flange 136 of the spacing member against the lower end of the tube 118.

Received within the lower end of the nut 134 is a ball headed pin 138 having a portion 140 surrounding the lower end of the tube 130. Carried on the ball portion of the pin 138 for swivelling movement is a pipe 142 connected by a flexible hose 144 to a suction pump as will be explained. The pipe 142 communicates through a plurality of ports 146 and an annular groove 148 with a bore 150 in the pin 138. This bore 150 in turn communicates with the bore through the tube 130 and accordingly with the interior of the suction cup 112. With the parts positioned as shown in Fig. 7, however, the bore 150 through the pin 138 also communicates with the atmosphere by way of ports 152 and passageways 154 in the nut 134. The upper ends of the passageways 154 are connected by an annular groove 156 bounded by sharp edges formed in the upper end of the nut and adapted to be closed by a rubber sealing ring 158 when it is desired to reduce the pressure within the suction cup 112 by preventing communication between the hose 144 and the atmosphere. It will be understood that the suction cup, the tubes 118, 130, the nut 134 and the pin 138 will rotate as a unit during rotation of the work support 22 without interfering with the communication between the hose 144 and the suction cup 112. It will further be understood that the nut 134 and the sealing ring 158 act as a valve to control the reduction of pressure within the suction cup depending upon the position of the rubber sealing ring 158.

Figure 1:
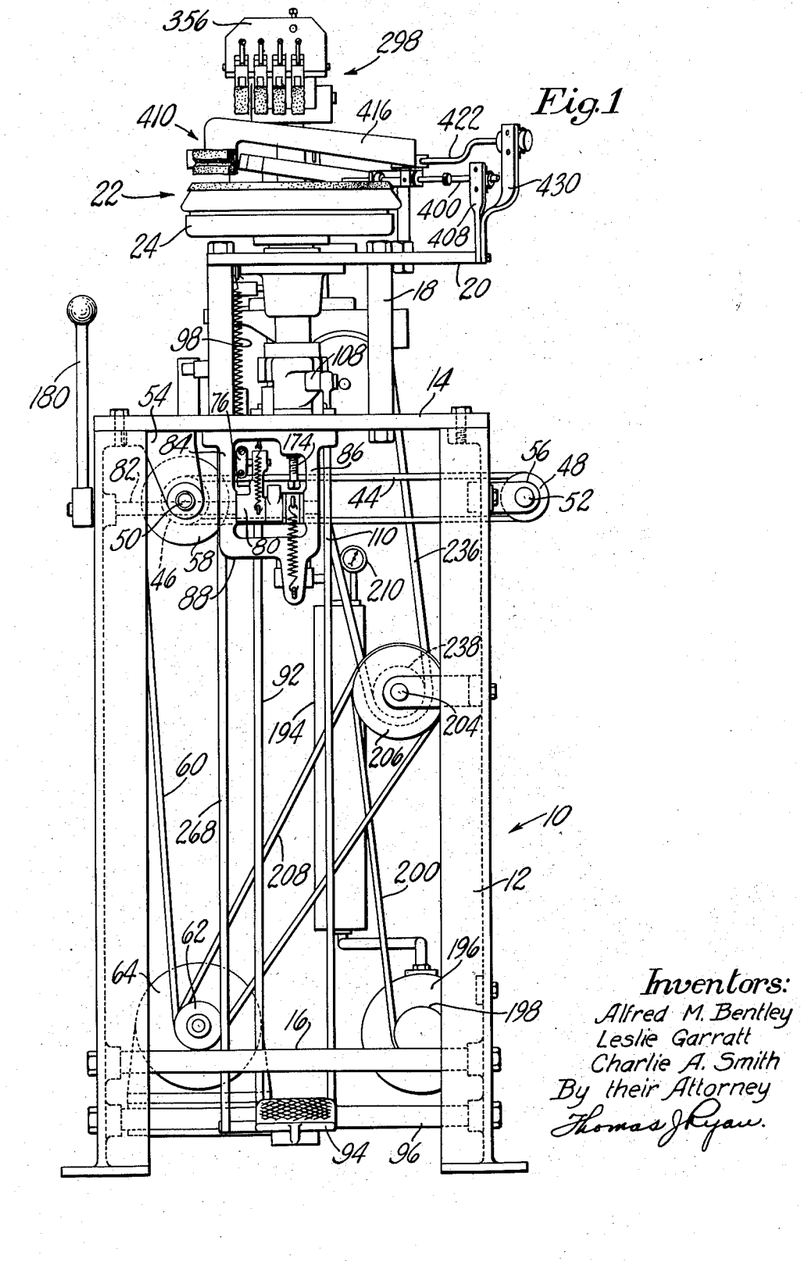
Fig. 1 is a front elevation of one form of machine in which the invention is embodied.

The ring 158 is carried by a flanged collar 160 connected by a pin 162 for up and down movements on the sleeve 118 but fixed for rotation therewith. Received between the flanges of the collar 160 are rolls 164 journaled on arms 166 of a yoke 168 (Figs. 3, 7, 15 and 16). This yoke is pivoted on the shaft 82 and is normally urged into the position shown in Fig. 7 by a tension spring 170, the movement of the yoke being limited by a stop screw 172 (Fig. 15) adjustably secured in the front end of the yoke. An adjustable stop screw 174 carried by the bracket 88 limits movement of the yoke against the force of the spring 170. The spring 170 normally holds the yoke in a position in which the suction tube 144 is open to the atmosphere by reason of the ring 158 (Fig. 7) being in a position elevated above the nut 134. In order to move the yoke 168 against the action of the spring 170, the shaft 82 carries a pawl 176 which normally rests upon a lug 178 projecting from one side of the yoke 168. The shaft 82 also has secured to it a handle 180 located to the left of the frame of the machine as shown in Fig. 1 whereby the operator may, by moving the handle rearwardly, turn the shaft 82 in a counterclockwise direction as viewed in Fig. 15 whereupon the pawl 176 acting through the lug 178 moves the yoke 168 against the action of the spring 170 to close the valve formed by the nut 134 and the ring 158 (Fig. 7).

Means are provided for locking the parts in these positions upon release of the handle 180 by the operator. For this purpose a latch 182 is pivoted at 184 on the bracket 88 and is urged forwardly or to the right as viewed in Fig. 15 by a spring 186. Upon movement of the yoke 168 by the operator against the action of the spring 170 to a position determined by the stop screw 174 the latch 182 is moved forwardly whereupon a shoulder 188 snaps over the lug 178 thus holding the parts in the positions to which they have been moved. Thus the pressure in the suction cup 112 which is engaged by the bottom face of the work is reduced and the work is held firmly on the support 22. At the end of the cycle of operations, the handle 180 secured to the shaft 82 is moved forwardly turning the shaft 82 in a clockwise direction as viewed in Fig. 15 whereupon an inclined face 190 on the pawl 176 engages a pin 192 on the latch 182 to move the latch out of locking engagement with the lug 178 whereupon the parts return to the positions shown in Figs. 7 and 15 in which the suction cup 112 is open to the atmosphere through the passages 154 of the nut 134 and the work may then be removed readily from the work support.

Figure 2:
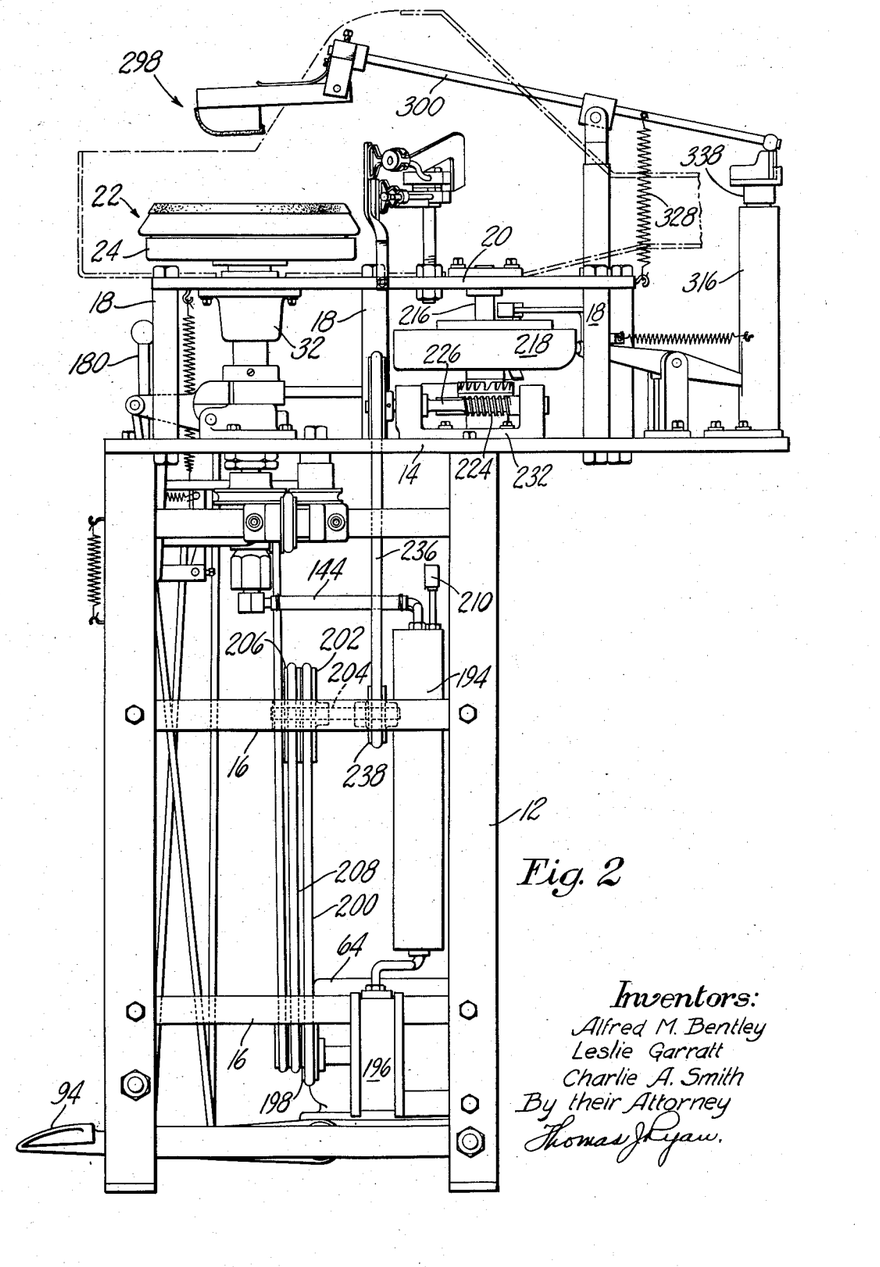
Fig. 2 is a side elevation of the machine.

The tube 144 is connected to the upper end of a tank 194 (Fig. 2) the lower end of which is connected to the low pressure side of a pump 196 carried by the base of the machine. This pump has a pulley 198 connected by a belt 200 to a pulley 202 secured to a shaft 204 which shaft also carries a pulley 206 connected by a belt 208 to the drive motor 64. Thus during operation of the machine the pump 196 is continually driven to maintain a reduced pressure in the tank 194, the pressure of which may be ascertained by a gage 210 connected to the tank.

Mechanism for operating the towing tool which engages the upper face of the work will now be described with particular reference to Figs. 3, 5 and 6. Journaled in bearings 212, 214 in the table 14 and the platform 20 respectively is a vertical shaft 216 on which is carried a cam 218, a worm gear 220 and a clutch member 222 secured to the worm gear 220. The worm gear is constantly rotated while the machine is in use by a worm 224 carried by a shaft 226 journaled in bearings 228, 230 extending upwardly from a bracket 232 secured to the table 14. Secured to the shaft 226 is a pulley 234 connected by a belt 236 to a pulley 238 (Fig. 2) carried by the shaft 204 which as heretofore explained is rotated continually while the machine is in use.

The cam 218 is arranged to be connected through the clutch member 222 to the worm gear 220 upon operation of the treadle 94 to cause rotation of the cam 218 through one complete revolution at the completion of which the cam is disconnected from the clutch. Slidably carried by the cam 218 is a vertically movable plunger 240 urged downwardly by a spring 242 acting between the plunger and the bottom of the recess in which the plunger is carried. A pin and slot connection 244 limits movement of the plunger with respect to the cam. If the plunger is permitted to move downwardly below the position shown in Fig. 6 by the force exerted by the spring 242 it engages between a pair of teeth of the cam member 222 to effect a driving engagement between the worm gear 220 and the cam 218.

With the machine at rest, the plunger 240 is held in an elevated position by an arm 246 having an inclined face 248 engageable with a flange 250 on the plunger 240. The arm 246 is pivoted at 252 on an arm 254 which in turn is pivoted on a vertical sleeve 256 carried by a bracket 258 secured to the table 14. The arm 246 is normally urged in a clockwise direction as viewed in Fig. 6 by a pair of springs 260 acting between the arm 246 and the arm 254, the position to which the arm 246 is urged by the springs being limited by a pin 262 held in vertical position within the sleeve 256 by an adjusting screw 264. The arm 254 is in turn urged in a clockwise direction, as viewed in Fig. 5, by a spring 266 thereby to hold the arm 246 with its inclined face 248 in contact with the flange 250 on the plunger 240 with the plunger thus held in its elevated position.

Figure 5:
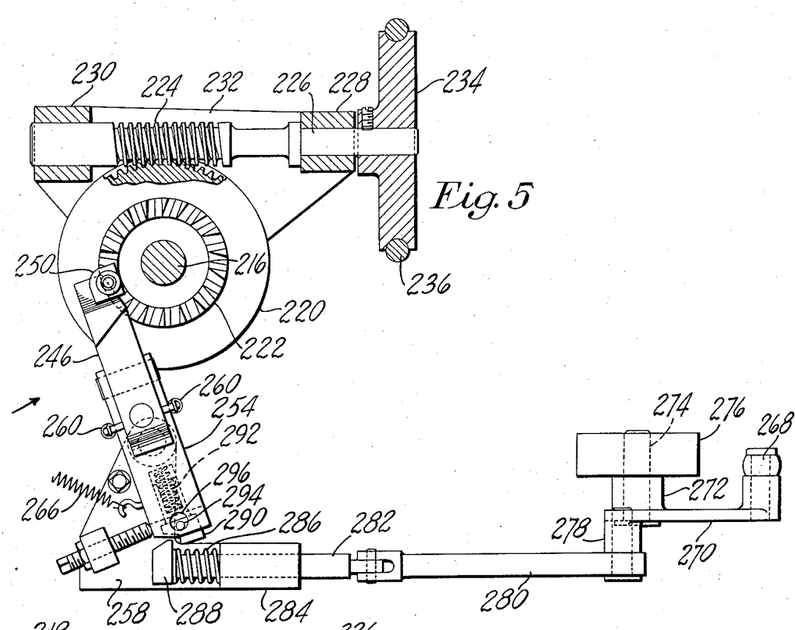
Fig. 5 is a plan view, partly in section, of a portion of the mechanism for controlling the movements of a tool-carrying arm.
Figure 6:
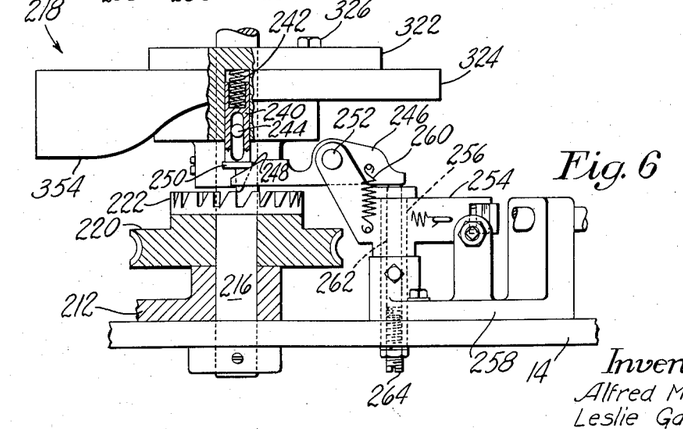
Fig. 6 is a side elevation, partly in section, of the mechanism shown in Fig. 5 looking in the direction of the arrow of Fig. 5.

The arm 254 is moved in a counterclockwise direction, as viewed in Fig. 5, against the action of the spring 266 to move the arm 246 away from the flange 250 when it is desired to initiate a cycle of operations on a work piece, by depressing the treadle 94. For this purpose the treadle is connected by a treadle rod 268 to an arm 270 of a bell crank lever 272 pivoted on a pin 274 carried by a bracket 276 on the table 14. The bell crank lever has a second arm 278 connected by a link 280 to a rod 282 slidable in a bearing 284 of the bracket 258. The rod 282 is normally urged to the left, as viewed in Fig. 5, by a spring 286 acting between the bearing 284 and a head 288 on the left end of the rod. Upon movement of the rod to the right by depression of the treadle, the head engages a latch 290 slidable in the arm 254 and urged outwardly thereof by a spring 292. The outer position of the latch 290 is limited by a pin 294 which passes through a hole 296 formed in the arm 254. The arm 254 is thus moved in a counterclockwise direction thus freeing the plunger 240 for downward movement and connecting the cam 218 with the clutch member 222 whereupon the clutch starts to rotate with the shaft 216. Upon further depression of the treadle the head 288 over-rides the latch 290 whereupon the arm 254 swings in a clockwise direction under the action of the spring 266 so that the inclined face 248 of the arm 246 will lie in the path of the flange 250 and the plunger 240 will consequently be lifted when the cam has made one complete revolution.

At an appropriate time during operation on the work piece, when the treadle has been depressed a sufficient amount to cause engagement of the clutch and driving of the cam 218, as described, a towing tool 298 engageable with the upper surface of the work piece is moved downwardly to contact the work piece at the central portion thereof and is then moved outwardly thereover. The towing tool is carried at the forward end of a rod 300 having secured thereto a collar 302 (Fig. 3) pivoted at 304 in a yoke 306 carried by a vertically extending rod 308 journaled in a sleeve 310 secured to the platform 20. Secured to the lower end of the rod 308 is a bell crank lever 312, one arm of which is connected by a spring 314 to a sleeve 316 which is secured to the table 14. The bell crank lever includes a forward extending arm 318 carrying a cam follower roll 320 (Fig. 4) which is held in engagement with the periphery of a cam member 322 of the cam 218 (Fig. 6). The cam 218 also includes a cam member 324 to which the cam member 322 is adjustably connected by a screw and slot connection 326. Upon rotation of the cam 218 the rod 308 is swung about a vertical axis by the cam member 322 thereby to move the towing tool 298 across the surface of the work piece.

Figure 3:
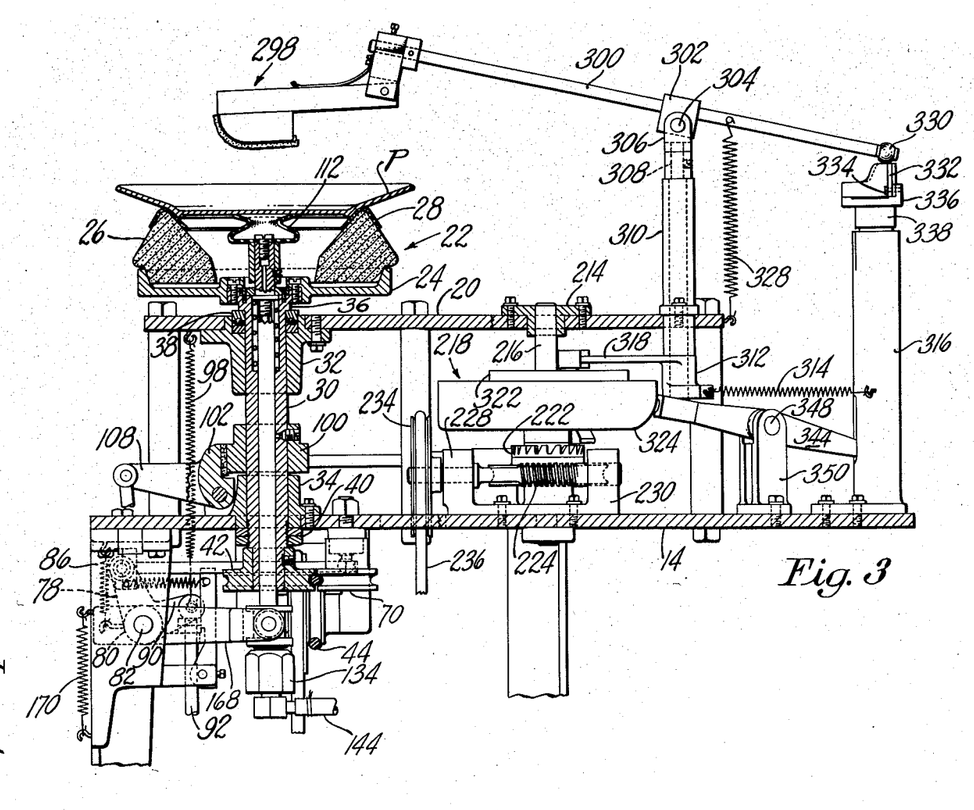
Fig. 3 is a vertical section through the upper portion of the machine.
Figure 4:
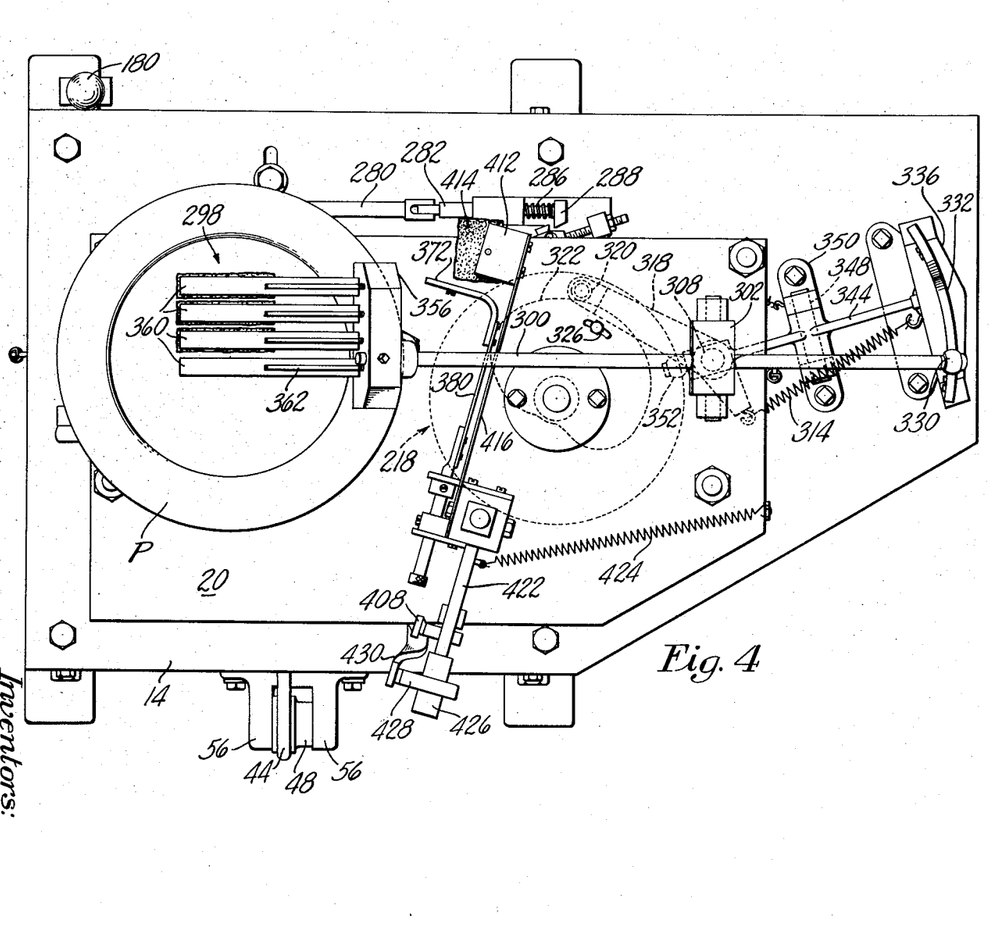
Fig. 4 is a plan view of the machine.
Figures 8, 9, 10, 11, 12, 13:
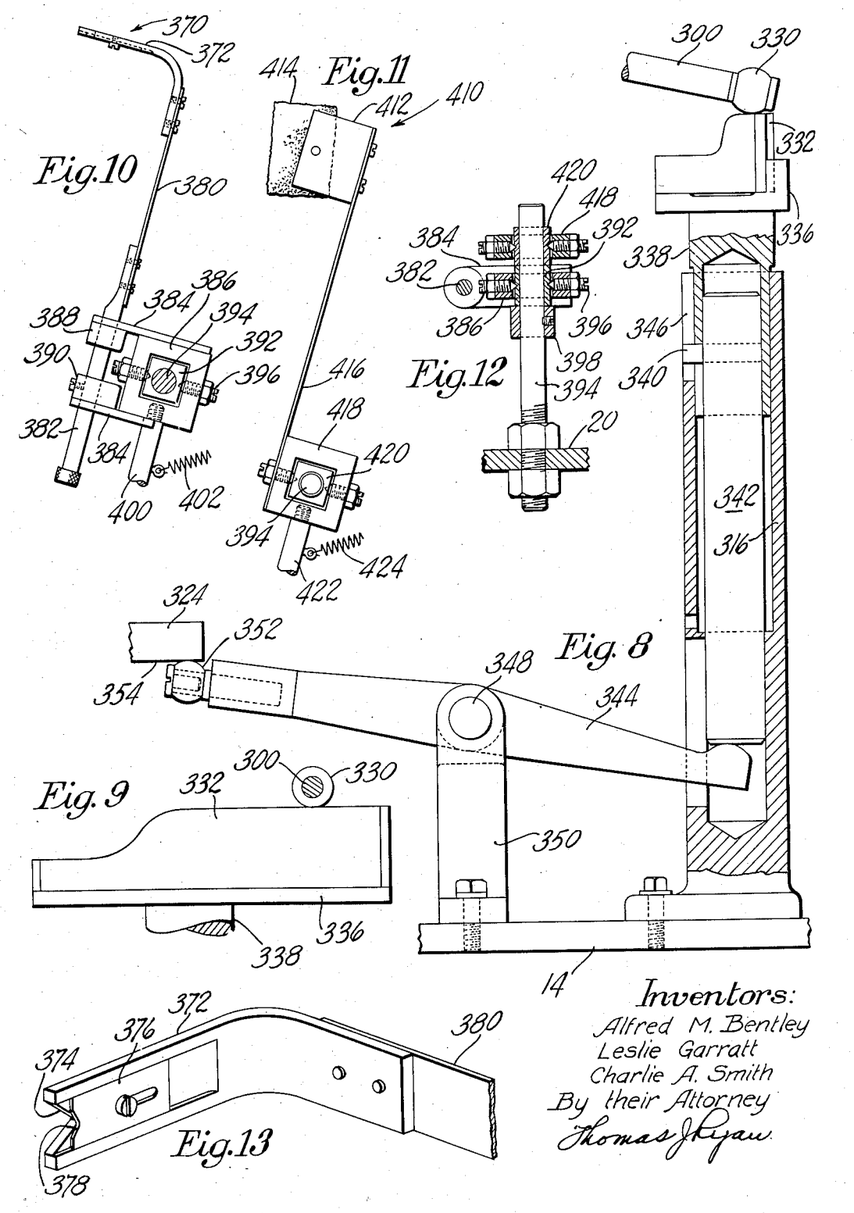
Fig. 8 is a side elevation, partly in section, of mechanism by which rocking movements are imparted to the tool-carrying arm.
Fig. 9 is a front elevation of a cam shown at the top in Fig. 8.
Fig. 10 is a plan view of the fettling tool and its supporting means.
Fig. 11 is a plan view of the edge towing tool and its supporting means.
Fig. 12 is a view in section of the supporting means for the fettling and edge towing tools.
Fig. 13 is a perspective view of the fettling tool on a larger scale than that of Fig. 10.

The forward end of the rod 300 is normally held in an elevated position as shown in Fig. 3 by a spring 328 connected between the rod and the platform 20. The rearward end of the rod carries a cam roll 330 held by the spring 328 in engagement with a cam plate 332 which is curved in plan and concentric with the axis of the rod 308. This cam plate is removably connected by screws 334 to a flanged plate 336 which is in turn mounted at the upper end of a plunger 338 slidable in the sleeve 316. A pin 340 (Fig. 8) connects the plunger to a rod 342 the bottom of which rests on the end portion of a lever 344 and the pin 340 rides in a slot 346 formed in the sleeve 316 so that rotation of the plunger is prevented.

The lever 344 is pivoted at 348 in a bracket 350 carried by the table 14 and the forward end of the lever carries a cam follower roll 352 which rides on the underface 354 of the cam member 324. It will be seen that movements of the rod 300 supporting the towing tool about the axis of the pin 304 are controlled by vertical movements of the plunger 338 by the cam 324 and by the contour of the cam plate 332 supporting the cam roll 330 at the rearward end of the rod 300. Thus the towing tool is moved vertically to accommodate the contour of the work piece being operated upon during the traverse of the upper face of the work piece.

The towing tool 298, as illustrated herein, comprises a block 356 secured to the forward end of the rod 300 and provided with a plurality of depending ears 358 between which are pivoted forwardly extending fingers 360. The forward ends of these fingers are urged downwardly by light springs 362 acting between the block and the fingers, the extent of downward swinging movements of the fingers with respect to the block being limited by engagement of the rearward ends of the fingers with the block. Carried by the forward ends of the fingers 360 are depending rubber blocks 364 the forward edge faces of which are curved. Carried by the forward and under edge face of the blocks 364 are strips of material suitable for towing the work piece. As shown herein one of the fingers may carry a piece of emery cloth 366 and the other fingers may carry pieces of felt 368.

Tools for fettling and towing the edge of the work piece are illustrated in Figs. 10 to 14. A fettling tool 370 is composed of an arm 372 preferably formed of aluminum and provided with a V-shaped notch 374 (Fig. 13) and with shoulders between which are received a plate 376 having a V-shaped notch 378 in its outer end. The notch 374 in the plate 372 guides the fettling tool into contact with the edge of the work but the apex of the notch 378 is preferably set somewhat in advance of the apex of the notch 374 so that the fettling is actually effected by the notch 378. The arm 372 being formed of aluminum does not cause discoloration of the work above and below the edge during subsequent firing as would an arm formed of steel.

The arm 372 has a portion bent at right angles to the work engaging end thereof and is connected by a flat steel spring 380 to a rod 382 carried by arms 384 which are secured to a block 386. Collars 388, 390 prevent axial movement of the rod 382 with respect to the arms 384 but permit turning of the rod relatively to the arms. The block 386 has a square hole therein to fit over a block 392 which is carried by a vertical rod 394 secured to the platform 20. The block 386 is tapped at opposite sides thereof to receive pivot screws 396 the inner ends of which are received by recesses in the block 392 so that the block 386 can pivot through a limited angle about the axes of the screws 396 on the block 392 which in turn can swivel about the axis of the rod 394. A collar 398 is carried by the rod to hold the block 392 in the desired vertical position thereon.

Carried by the block 386 and extending outwardly thereof is an arm 400 to which is connected a spring 402 acting to move the blocks 386, 392 about the axis of the rod 394 thereby to move the fettling tool into contact with the edge of the work piece. A counterweight 404 (Fig. 14) is adjustably carried on the arm 400 to counterbalance the weight of the fettling tool and spring clips 406 are carried by an arm 408 secured to and extending upwardly from the platform 20 for cooperation with the counterweight 404 on the arm 400 to hold the fettling tool in inoperative position as shown in Fig. 14 against the action of the spring 402.

An edge towing tool 410 composed of a holder 412 carrying a felt block 414 is mounted at the end of a spring steel arm 416 carried by a block 418 pivoted on an inner block 420 on the rod 394 just above the blocks 386, 392 supporting the fettling tool. The outer block 418 carries a rod 422 to which is connected a spring 424 for normally urging the fettling tool into contact with the edge of the work. A counterweight 426 (Fig. 14) adjustably carried by the arm 422 is arranged to be received in spring clips 428 carried by an arm 430 secured to the platform 20 for normally holding the edge towing tool in inoperative position. As shown in Fig. 14, the spring steel arm 416 supporting the towing tool has a downwardly extending portion at its outer end so that the towing tool will operate in the same general plane as the fettling tool for engagement with the edge of the work. Because of the mounting of the fettling and towing tools it will be apparent that they are capable of accommodating themselves to the edge of the work as the work is rotated even though the margin of the work may be scalloped or undulated.

Figure 14:
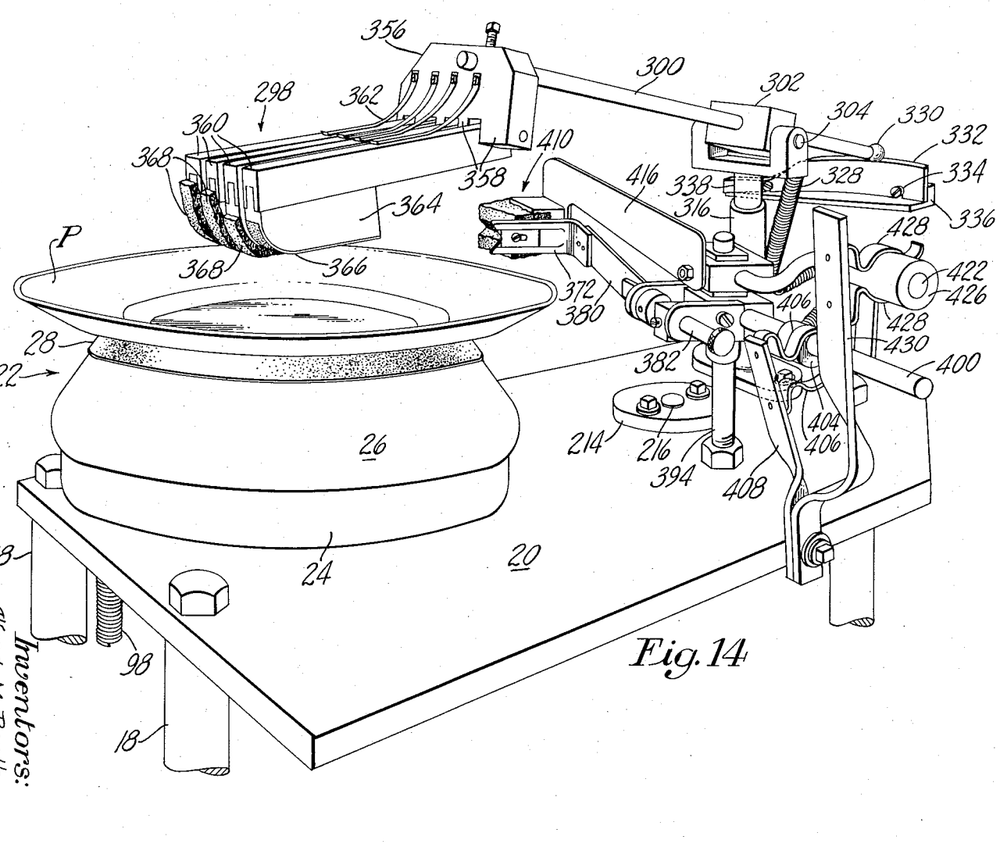
Fig. 14 is a perspective view of the upper part of the machine illustrating the positions of the work treating tools prior to operation on the work piece.

In the operation of the machine a work piece such as a plate P is placed on the work support as shown in Fig. 14 following which the treadle 94 is depressed slightly to bring the belt 44 into light engagement with the pulley 42 whereupon the work support starts turning slowly. At this time the operator will adjust the work on the work support if necessary so that it will be centrally disposed thereon following which the handle 180 at the left side of the machine is moved to force the ring 158 (Fig. 7) downwardly thus closing passageways 154 to the atmosphere whereby pressure in the suction cup 112 is reduced to hold the work firmly in place on the rotating work support.

The treadle is then depressed somewhat further to cause a somewhat higher rotation of the work support and the arms 400, 422 (Fig. 14) are released from the spring clips 406, 428 respectively so that the fettling and edge towing tools are brought into engagement with the edge of the work. At this time the operator may turn the rod 382 a little one way and the other to turn the notch 378 of the plate 376 through an arc about the edge of the work. The fettling tool is then disengaged from the work and held in inoperative position by the spring clips 406. At the same time the treadle 94 is depressed fully whereupon the work support comes up to its full speed of rotation and the face 248 (Fig. 6) of the arm 246 is disengaged from the flange 250 of the plunger 240 to cause engagement of the clutch member 222 by the plunger thus initiating rotation of the cam 218.

The towing tool 298 (Fig. 14) now moves downwardly by virtue of the roll 352 engaging the face 354 of the cam 324 to engage the upper surface of the work, the finger 364 carrying the emery cloth 366 engaging the blank in the locality of its center. As the cam 218 continues to rotate the cam member 322 acting through the cam roll 320 (Fig. 4) and the arm 318 causes the towing tool to swing across the surface of the work from the center outwardly. Toward the end of its outward swinging movement the roll 330 rides down the inclined portion of the cam plate 332 whereupon the forward end of the rod 300 is raised by the spring 328 so that the last finger 360 to leave the work does not fall off the edge of the work but is lifted therefrom at the instant of its leaving. The towing tool 298 is then held above the level of the work as the rod 300 swings back to the position shown in Fig. 4.

After one revolution of the cam 218 the plunger 240 (Fig. 6) is disengaged from the clutch member 222 and the cam comes to rest. The operator then removes the edge towing tool 410 away from the work replacing the arm 422 in its spring clips 428 and removes his foot from the treadle whereupon the work support comes to rest by the action of the brake 102, 104 (Fig. 7). The handle 180 is then pulled forwardly to open the passageways 154 (Fig. 7) to the atmosphere releasing the suction on the blank at the suction cup 112 so that the blank may be readily removed.

Certain modifications of the invention may be made without departing from the spirit and scope of the invention. For example, the towing tool 298 may assume any form suitable for operating on the face of the work, and may comprise a circular disk such as rubber which may be air filled to provide a cushion over which a piece of towing material is laid, the disk being mounted at the forward end of the rod 300 for rotation about an axis inclined at a small angle to the normal to the surface of the work when operating thereon. It may also be desirable to impart to the towing tool an operating motion other than swinging across the surface of the work at a uniform or substantially uniform rate. Thus the face of the cam member 322 (Fig. 4) may be shaped to swing the tool more quickly over flat portions of the work and allowing it to dwell somewhat longer over other portions. The tool may also have imparted to it a rocking motion about the axis of the rod 300 or may be arranged to progress across the surface of the work in a series of short back-and-forth motions about the axis of the plunger 338, or it may have imparted to it a vibrating motion by appropriately shaping the cam member 322 or by other suitable means.

Having thus described our invention what we claim as new and desire to secure by Letters Patent of the United States is:

1. A machine for operating on circular blanks of ceramic ware comprising a work support for supporting a blank for rotation about a substantially vertical axis, a tool for towing the upper surface of the blank, an arm supporting said tool for movements relatively to said work support, means mounting said arm for pivotal movements about a horizontal axis to move the tool toward and away from said work support, means mounting said arm for movements about an axis substantially parallel to the axis of rotation of said work support to move the tool over the surface of a work piece on the support, cam means for first moving said arm about the first-mentioned axis to move the tool into engagement with a blank on the support, cam means for then moving said arm about the second-named axis to move the tool over the surface of the blank, the first-named cam means then operating to move the arm about the first-named axis to elevate the tool.

2. A machine for operating on circular blanks of ceramic ware comprising a work support for supporting a blank for rotation about a substantially vertical axis, a tool for towing the upper surface of the blank, an arm supporting said tool for movements relatively to said work support, means mounting said arm for pivotal movements about a horizontal axis to move the tool toward and away from said work support, means mounting said arm for movements about an axis substantially parallel to the axis of rotation of said work support to move the tool over the surface of a work piece on the support, cam means for first moving said arm about the first-mentioned axis to move the tool into engagement with a blank on the support, cam means for then moving said arm about the second-named axis to move the tool over the surface of the blank, the first-named cam means then operating to move the arm about the first-named axis to elevate the tool, and means operative only upon rotation of said support at a predetermined rate for initiating operation of said cam means.

3. A machine for operating on circular blanks of ceramic ware comprising a work support for supporting a blank for rotation about a substantially vertical axis, a tool for towing the upper surface of the blank, an arm supporting said tool for movements relatively to said work support, means mounting said arm for pivotal movements about a horizontal axis to move the tool toward and away from said work support, means mounting said arm for movements about an axis substantially parallel to the axis of rotation of said work support to move the tool over the surface of a work piece on the support, cam means for first moving said arm about the first-mentioned axis to move the tool into engagement with a blank on the support, cam means for then moving said arm about the second-named axis to move the tool over the surface of the blank, the first-named cam means then operating to move the arm about the first-named axis to elevate the tool, the first-named cam means comprising a cam acting directly on said arm during movement of the arm about the vertical axis and a cam operative to vary the elevation of the first-named cam according to a predetermined cycle.

References Cited in the file of this patent
UNITED STATES PATENTS

| | | |
|---|---|---|
| 1,759,058 | Miller | May 20, 1930 |
| 1,812,893 | Miller | July 7, 1931 |
| 2,033,827 | Harvey et al. | Mar. 10, 1936 |
| 2,282,372 | Miller | May 12, 1942 |
| 2,612,729 | Walley et al. | Oct. 7, 1952 |
| 2,755,531 | Arelt | July 24, 1956 |